(No Model.)
A. W. EDDY.
EARTHENWARE COVER FOR MILK VESSELS.
No. 288,931. Patented Nov. 20, 1883.
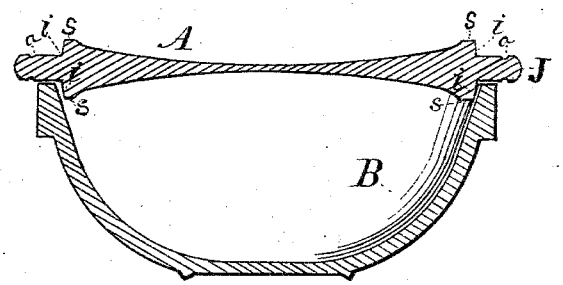
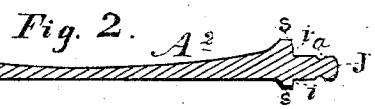
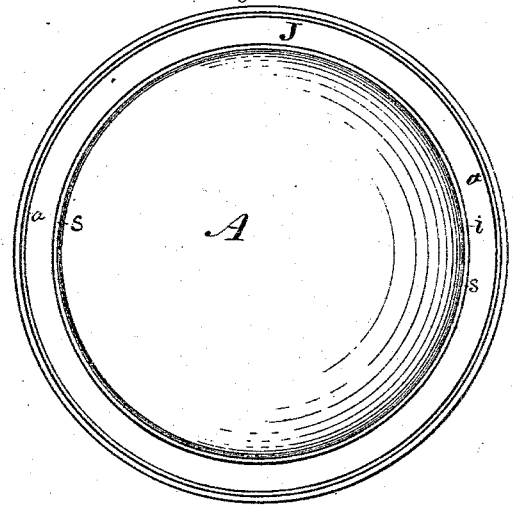
WITNESSES.
T. J. Price
John M. Price Jr
INVENTOR.
A. W. Eddy

UNITED STATES PATENT OFFICE.

ALSON W. EDDY, OF MACOMB, ILLINOIS.

EARTHENWARE COVER FOR MILK-VESSELS.

SPECIFICATION forming part of Letters Patent No. 288,931, dated November 20, 1883.

Application filed March 1, 1883. (No model.)

*To all whom it may concern:*

Be it known that I, ALSON W. EDDY, a resident of Macomb, in the county of McDonough and State of Illinois, have invented a new and useful Improvement in Earthenware Covers for Milk-Vessels; and I do hereby declare the following to be a full, clear, and exact description thereof, reference being had to the accompanying drawings, forming part of this specification, in which—

Figure 1 is a vertical section. Fig. 2 is a sectional view of the cover in different form. Fig. 3 is a plan view of the cover.

The object of this invention is to supply a long-needed want in earthenware lids or covers suitable for milk-pans or butter-jars and other similar vessels by so constructing said covers that water or ice can be placed on top of them for the purpose of cooling and keeping cold the contents in the vessel covered; and its novelty consists in an earthenware cover with one or both sides concaved, having raised flanges near its outer circumference on both sides, directly opposite each other, and of sufficient height to hold a pint or more of water, or a lump of ice sufficient to make that amount of water, on either side of the cover when placed on a vessel; also, in a grooved rim projecting outward from the center of the raised flanges, which forms shoulders on both sides of the cover, and extends outward sufficient to project over the edge of the vessel, so as to be easily grasped with the hand.

In the drawings, A, Fig. 1, represents an earthenware lid or cover with both sides concaved, having raised flanges $s\ s$ on both sides, directly opposite each other, so that either side can be used for the top.

$A^2$, Fig. 2, represents a cover with the upper side concaved and the under side plain. The flanges $s\ s$ are raised sufficient in height to hold a pint or more of water, or a lump of ice that will make that much water, on either side when placed on a vessel. The flanges, being opposite each other, are mainly for the purpose of preventing the cover from warping while being baked in the kiln, in which the covers are stacked on each other several feet high.

J represents an outward-projecting rim from the center of the raised flanges $s\ s$, which, being less in thickness than said flanges are wide, causes the flanges $s\ s$ to form shoulders $i\ i$ on each side of the rim, in which, near its outer circumference, small grooves $a\ a$ are formed, which are to prevent any water from running down under the cover into the vessel B, and they are also convenient when removing the cover from off the vessel, making it easily held in the hand.

The operation is as follows: The cover is placed over the vessel B, and if the vessel contains a substance that is required to be cooled and kept cold, about a pint of water, or a lump of ice sufficient to make that amount of water, is placed on the cover A. The water commences at once to evaporate, which absorbs the heat in the cover, and causes it to refrigerate the contents in the vessel covered.

What I claim as new, and desire to secure by Letters Patent, is—

The reversible earthenware cover A, concaved, as described, and provided with flanges $s\ s$, shoulders $i\ i$, and grooved rim J, substantially as described.

ALSON W. EDDY.

Witnesses:
L. J. PRICE,
J. M. PRICE, Jr.